Patented Jan. 1, 1929.

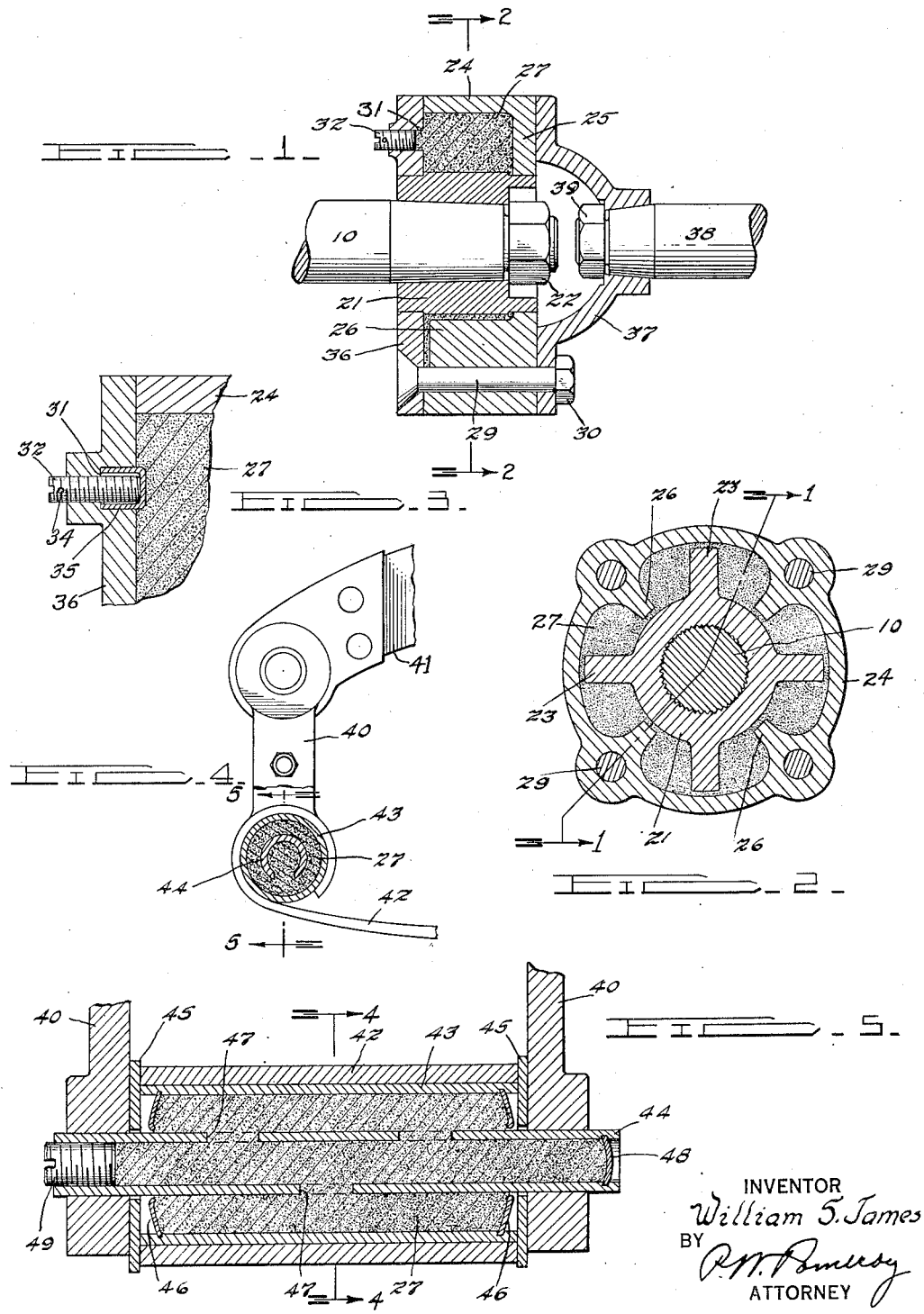

1,697,065

UNITED STATES PATENT OFFICE.

WILLIAM S. JAMES, OF SOUTH BEND, INDIANA, ASSIGNOR TO THE STUDEBAKER CORPORATION, OF SOUTH BEND, INDIANA, A CORPORATION OF NEW JERSEY.

ELASTIC-CONNECTION REGULATOR.

Application filed March 18, 1927. Serial No. 176,570.

This invention relates to elastic or resilient connections and the principal object is to provide means for regulating and controlling the resilient characteristics thereof.

Another object is to provide an elastic or resilient connection in which the resilient material thereof is confined within a closed space, means being provided for adjustably controlling the volume of said space whereby the density of the resilient material confined therein may be varied to best suit conditions in which said connection is employed.

The above being among the objects of the present invention, the same consists in certain features of construction and combinations of parts to be hereinafter described with reference to the accompanying drawing, and then claimed, having the above and other objects in view.

In the accompanying drawing which illustrates suitable embodiments of the present invention, and in which like numerals refer to like parts throughout the several different views, Figure 1 is a sectional view taken centrally through a resilient joint for aligned shafts, as on the line 1—1 of Figure 2, the joint being provided with adjustable means for controlling the density of the resilient material employed therein.

Figure 2 is a sectional view taken on the line 2—2 of Figure 1.

Figure 3 is an enlarged fragmentary view taken substantially on the same line as Figure 1 and showing a slightly modified construction of the means for controlling the resilient characteristics of the joint.

Figure 4 is a fragmentary side view of an automobile frame member and cooperating spring, showing a shackle connecting the same embodying resilient characteristics, and to which a suitable embodiment of the present invention is adapted.

Figure 5 is a sectional view of the shackle taken substantially on the line 5—5 of Figure 4.

In resilient connections such as are commonly employed between relatively movable parts, as well as parts relatively stationary with respect to each other, it has often been found necessary to change the resilient characteristics of the same in order that the most advantageous results may be obtained from the devices so connected, or from the resilient connection itself. In such connections it is the usual practice to employ rubber as the resilient element therein and when it becomes necessary to change the resilient characteristics of the connection, it has been the usual practice to change the grade or composition of the rubber in order to obtain the correct resilient characteristics of the connection itself. A single resilient connection may be adaptable for use in a variety of different positions and in connection with a variety of different parts or objects, and it will be evident that it is extremely difficult in such a case to provide a grade of rubber which will be satisfactory to any use to which such a connection may be adapted.

It is the principal object of the present invention to provide means for use with such connections whereby a single grade of rubber may be employed and the resilient characteristics thereof may be so controlled that the connection may be adjusted to best suit the need of any construction in connection with which it is used.

Many constructions have been provided where means were employed for drawing down or squeezing the rubber together, but as far as I have been able to determine in all those constructions the rubber has not been held within a closed and nonflexibly walled space, but on the contrary, there were openings or spaces through which the rubber might extrude, for which reason its resilient characteristics were affected but slightly, if any, when it was attempted to compress it. I have found that if in such connections the rubber is positioned in a closed space without any opening or spaces through which the rubber may extrude upon being compressed, if the volume of such space is decreased, thereby compressing the rubber, the resilient characteristics of the rubber are materially changed, the density of the rubber being increased upon compression and its resilient characteristics being accordingly diminished. I have made use of this fact in the present invention in connection with those connections which employ rubber as the resilient element.

In accordance with the present invention, I construct such connections in such a manner that the rubber element (or elements) thereof is confined within a closed space devoid of any openings or spaces through which the rubber may have an opportunity of extruding, and I provide readily adjustable means for varying the volume of such spaces, whereby the rubber contained therein may be diminished in volume or increased in volume as the case may be, whereby the resilient characteristics of such connection may be readily varied and controlled to most suitably correspond to the use to which it is put.

Referring to the accompanying drawing, in order to more clearly explain the present invention, I show in Figures 1 to 3, inclusive, a resilient connection such as may be used between a pair of aligned shafts. Such a connection may be employed between the clutch and transmission of an automobile to prevent tortional vibrations of the engine crank shaft from being transmitted to the transmission, or it may be employed in the propeller shaft line of automobiles to compensate for the uneven rotational movements of the propeller shaft caused by certain types of universal joints, or for a variety of other uses.

The connection shown comprises in part, a hub 21 which is secured to the tapered outer end of the shaft 10 by the nut 22. The hub is provided with four equally spaced radially extending splines 23 between and spaced from the end surfaces thereof. Surrounding the hub 21 and splines 23 is the casing 24 which is provided with an end wall 25 which is piloted on the forward end of the hub 21 outwardly of the splines 23. The inner walls of the casing 24 and end wall 25 are spaced from the outer edges of the splines 23 and four radially projecting splines 26 extend inwardly from the inner wall of the casing 24 to a point adjacent but spaced from the hub 21, each spline 26 being positioned midway between a pair of splines 23. The space between the hub 21 and casing 24, and between the splines 23 and 26, is filled with rubber or other resilient material 27. A cap or cover member 36 is provided which is piloted on the rear end of the hub 21 and serves to close the open end of the casing 24. A flange member 37, secured to the tapered end of the aligned shaft 38 by the nut 39, is secured to the end wall 25 of the housing 24 in concentric relation with the shaft 10 by bolts 29 which extend through the cover 36, housing 24, and flange member 37 and draw all these parts into close relationship by means of the nuts 30, thereby immovably securing these parts together for equal rotational movement. It will be apparent that in the construction shown the rubber is confined within a closed space and no openings or spaces are provided through which the rubber 27 may possibly extrude upon compression of the same.

The connection just explained is adaptable to almost any type of motor vehicle. In such a connection it may be found that its resilient characteristics when applied to one vehicle may be found satisfactory in connection therewith, but will be entirely unsatisfactory when applied to another vehicle because of the different resilient characteristics which are present in the construction of such other vehicle. I have found that even when such a construction is applied to two motor vehicles of the same make and model the resilient characteristics of the connection suitable for one of such motor vehicles may not be suitable for the other thereof. In order to remedy this condition and to provide a ready means for varying the resilient characteristics of each connection to suit the conditions present in the particular vehicle to which it is adapted, I provide a plurality of threaded openings 31 in the end wall 25, which are closed by the threaded plugs 32. The plugs 32 may be threaded into the opening 31 and thereby reduce the volume of the space within which the rubber 27 is confined, thereby compressing the rubber 27 and increasing its density. The increasing density of the rubber 27 is accompanied by a corresponding decrease in the resilient charactertistics of the connection. On the other hand, if the connection is found to be less resilient than is most suitable for the particular vehicle in connection with which it is used, the plug 32 may be threaded outwardly and thus increase the volume within which the rubber 27 is confined, the density of the rubber in such a case being decreased and causing a corresponding increase in the resilient characteristics thereof.

I have found that a very small adjustment of the plugs 32 will vary the resilient characteristics of the connection a considerable amount. It is preferable that means be provided for locking the plugs 32 against movement when they have once been adjusted to effect the most suitable results, and for this reason it is preferable to provide a small drilled opening such as 33 in each of the plugs 32 in order that a wire such as 34 may be passed through all of the plugs and thereby lock all of the same against inadvertent movement.

In Figure 1, I show the rubber 27 as directly entering the opening 31, and it will be apparent that in such case the rubber 27 will completely fill the threads of the openings 31 and will increase the resistance to the turning of the plugs 32, although I have found that this is not particularly objectionable.

In Figure 3 I show a construction designed to prevent the rubber 27 from affecting the functioning of the screw or plug 32. In this construction the inner ends of the openings 31 are counterbored to a substantially greater diameter than the outside diameter of the plugs 32, and in each of these counterbores I provide a cup-shaped member 35 axially slidable therein and of sufficient inside diameter to freely receive the corresponding plug 32 therein, the cup 35 being slidable in the opening 31 and the plug 32 bearing against the inner bottom surface thereof. Adjustment of the plugs 32 in this construction has the same effect of increasing or decreasing the volume of the rubber as the construction shown in Figure 1.

In Figures 4 and 5, I show the present invention in a motor vehicle spring shackle construction. As in conventional constructions the links 40 are provided for shackling the end of the frame side member 41 to the end of the spring 42, but the construction shown incorporates certain novel features in the connection between the links 40 and the end of the spring 42, and between the links 40 and the end of the frame 41, and as the construction at both ends of the links 40 is substantially the same, only one end will be described, it being kept in mind that the other end is substantially identical.

The usual shackle bolt of conventional construction is replaced, in the construction shown, by an outer shell 43 of a length commensurate with the width of the spring 42, and nonrotatably embraced within the eye formed at the end of same. Positioned within the sleeve 43 and coaxial therewith is a smaller sleeve 44 provided with a substantial space between its outer surface and the interior wall of the sleeve 43, its ends projecting out past the ends of the sleeve 43 and being nonrotatably received in the ends of the links 40. Washers 45, preferably of a type having dry lubricating properties, are positioned between the ends of the sleeve 43 and the adjacent link 40. Washerlike members 46 are secured within the ends of the sleeve 43 and extend inwardly into sliding contact with the outer surface of the inner sleeve 44. The inner sleeve 44 is provided with a plurality of openings 47 connecting its interior with the interior of the outer sleeve 43 between the members 46, and one end of the inner sleeve 44 is provided with a plug 48 which seals that end thereof. The other end of the inner sleeve 44 is provided with an adjustable plug 49. The interior of the inner sleeve 44 and the space between the inner sleeve 44 and the outer sleeve 43 between the member 46 are completely filled with rubber which is preferably vulcanized or otherwise bonded to the contacting surfaces.

In this construction it will be apparent that there is no rubbing action of the parts connecting the shackle link 40 to the end of spring 42 as in conventional constructions where a plain shackle bolt is used, but instead in this construction, upon movement of the spring 42, the rubber between the inner shell 44 and outer shell 43 is deformed to permit this movement and consequently there is no rubbing action to cause wear of the parts and no friction surfaces to require lubrication. In this type of shackle construction as in any other resilient connection, one application of the same may require different resilient characteristics of the rubber than in another construction, and the construction shown provides means whereby the resilient characteristics of the rubber 27 may be controlled to provide the most advantageous results. This is accomplished by threading the plug 49 either inwardly or outwardly in the inner sleeve 44. For instance, should less resiliency of the rubber 27 be required, the plug 49 may be threaded further into the inner sleeve 44, in which case the rubber 27 will be forced ahead of the plug 29 and will be compressed, sufficient rubber passing through the openings 47 to cause a like compression between the inner sleeve 44 and the outer sleeve 43 between the end member 46, the openings 47 allowing an equalization of the compression of the rubber on both sides of the sleeve 44. In a like manner the resilient characteristics of the shackle may be increased by backing the plug 29 further out of the inner sleeve 44.

From the foregoing description it will be apparent that the present invention provides ready and easy means for varying the resilient characteristics of resilient joints employing rubber as the resilient element in order to most suitably adapt such joints to the particular construction in which they are employed. In addition, the present invention may be adapted to almost any conventional form of rubber joint or connection with but a very small increase in the cost thereof.

Formal changes may be made in the specific embodiment of the invention described without departing from the spirit or substance of the broad invention the scope of which is commensurate with the appended claims.

What I claim is:

1. In a resilient connection, a pair of parts comprising a casing and a hub member cooperating to form a closed space, rubber completely filling said space for transmitting forces from one of said parts to the other of said parts, and adjustable means for varying the volume of said rubber.

2. In a resilient connection, a pair of independently movable parts provided with walls forming a space of fixed area, means for securing said parts in operative relationship, rubber enclosed within said space, and screw means projecting through one of said walls into said space for varying the volume of the space occupied by said rubber.

3. In a resilient connection, a pair of parts comprising a casing and a hub member movable independently of each other and slidably engaging each other to form an imperforate chamber, said chamber being filled with rubber, and means for adjustably controlling the volume of said rubber within said chamber whereby the density of said rubber may be varied.

4. In a resilient connection, a pair of relatively movable parts provided with co-acting surfaces forming a housing substantially free of openings, said housing being filled with rubber tending to cause equal movement of said parts, and adjustable means operable to vary the volume of said rubber to control the density thereof.

5. In a resilient connection for a pair of aligned shafts, a housing carried by one of said shafts, a hub member carried by the other of said shafts co-acting with said housing, and a rubber member for causing said housing to turn with said hub, said member allowing a limited amount of movement of said housing about said hub as a center, and adjustable means for varying the density of said rubber.

6. In a resilient connection, a housing member, a hub member co-acting therewith, rubber means for causing said hub to follow the major rotational movements of said housing member and permitting a limited cushioned rotary movement to be imparted to said hub without affecting the position of said housing member, and means for varying the resilient characteristics of said rubber.

7. In a resilient connection, a housing, a shaft for supporting said housing, a noncircular surface movable directly with said shaft, a noncircular surface movable directly with said housing, and rubber means co-operating with both of said surfaces tending to hold said surfaces in fixed relative position and distortable under pressure to permit a limited relative movement of said housing in respect to said shaft, and adjustable means for varying the distortable characteristics of said rubber means.

8. In a resilient connection for a pair of aligned shafts, one of said shafts being provided with a hub, the other of said shafts being provided with a housing slidably engaging said hub and relatively imperforate, elastic means enclosed within said housing tending to cause equal movement of said shafts, and adjustable means carried by said housing for varying the resilient characteristics of said elastic means.

9. In a resilient connection, a pair of relatively movable parts co-acting to form a relatively closed housing, a freely distortable resilient material enclosed within said housing, openings in said housing, slidable plugs carried in said openings, and screw means cooperating with each of said plugs for controlling the position thereof in respect to the interior of said housing.

Signed by me at South Bend, Indiana, this 16th day of March, 1927.

WILLIAM S. JAMES.